(12) United States Patent
Scheetz et al.

(10) Patent No.: US 8,799,432 B1
(45) Date of Patent: Aug. 5, 2014

(54) MANAGED COMPUTER NETWORK CACHING REQUESTED AND RELATED DATA FROM REMOTE COMPUTERS

(75) Inventors: Michael A. Scheetz, Ft. Collins, CO (US); Roy Johnson, Ft. Collins, CO (US); John Liddell Long, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2240 days.

(21) Appl. No.: 11/590,395

(22) Filed: Oct. 31, 2006

(51) Int. Cl.
*G06F 15/173* (2006.01)

(52) U.S. Cl.
USPC ............... 709/223; 709/203; 707/10

(58) Field of Classification Search
USPC .................... 709/223, 203; 707/10
See application file for complete search history.

(56) References Cited

U.S. PATENT DOCUMENTS

| | | | | |
|---|---|---|---|---|
| 5,925,100 | A * | 7/1999 | Drewry et al. ............... | 709/219 |
| 6,301,605 | B1 * | 10/2001 | Napolitano et al. .......... | 709/201 |
| 6,959,320 | B2 * | 10/2005 | Shah et al. ................... | 709/203 |
| 6,993,540 | B2 * | 1/2006 | Hudson et al. ............... | 707/206 |
| 7,032,011 | B2 | 4/2006 | Woodard et al. | |
| 7,058,936 | B2 * | 6/2006 | Chilimbi et al. ............. | 717/158 |
| 7,062,567 | B2 * | 6/2006 | Benitez et al. ............... | 709/231 |
| 7,085,819 | B2 | 8/2006 | Bright et al. | |
| 7,089,331 | B1 | 8/2006 | Gollapudi et al. | |
| 7,222,172 | B2 * | 5/2007 | Arakawa et al. ............. | 709/224 |
| 7,302,547 | B2 * | 11/2007 | Powers et al. ................ | 711/209 |
| 7,437,364 | B1 * | 10/2008 | Fredricksen et al. .......... | 707/10 |
| 7,437,438 | B2 * | 10/2008 | Mogul et al. ................. | 709/223 |
| 7,734,892 | B1 * | 6/2010 | Rozas et al. .................. | 711/208 |
| 2002/0091763 | A1 * | 7/2002 | Shah et al. ................... | 709/203 |
| 2002/0184327 | A1 * | 12/2002 | Major et al. ................. | 709/213 |
| 2003/0115346 | A1 * | 6/2003 | McHenry et al. ............ | 709/229 |
| 2004/0128346 | A1 * | 7/2004 | Melamed et al. ............ | 709/203 |
| 2004/0162841 | A1 * | 8/2004 | Bernstein et al. ............ | 707/100 |
| 2004/0260883 | A1 * | 12/2004 | Wallin et al. ................. | 711/137 |
| 2006/0112247 | A1 * | 5/2006 | Ramany et al. .............. | 711/165 |
| 2006/0212524 | A1 * | 9/2006 | Wu et al. ..................... | 709/206 |
| 2007/0005660 | A1 * | 1/2007 | Idei et al. ..................... | 707/200 |
| 2007/0005946 | A1 * | 1/2007 | Zimmer et al. ................ | 713/1 |
| 2007/0043860 | A1 * | 2/2007 | Pabari .......................... | 709/224 |
| 2007/0067382 | A1 * | 3/2007 | Sun .............................. | 709/203 |
| 2007/0156876 | A1 * | 7/2007 | Sundarrajan et al. ........ | 709/223 |
| 2007/0250601 | A1 * | 10/2007 | Amlekar et al. ............. | 709/219 |
| 2008/0126780 | A1 * | 5/2008 | Rajkumari et al. ............ | 713/2 |
| 2008/0178298 | A1 * | 7/2008 | Arai et al. ...................... | 726/29 |

* cited by examiner

*Primary Examiner* — Azizul Choudhury
*Assistant Examiner* — James Forman

(57) ABSTRACT

The present invention provides a system and method for managing a network. In response to an original request, a management station sends an augmented request to a remote server for information fulfilling the original request plus additional information available.

10 Claims, 1 Drawing Sheet

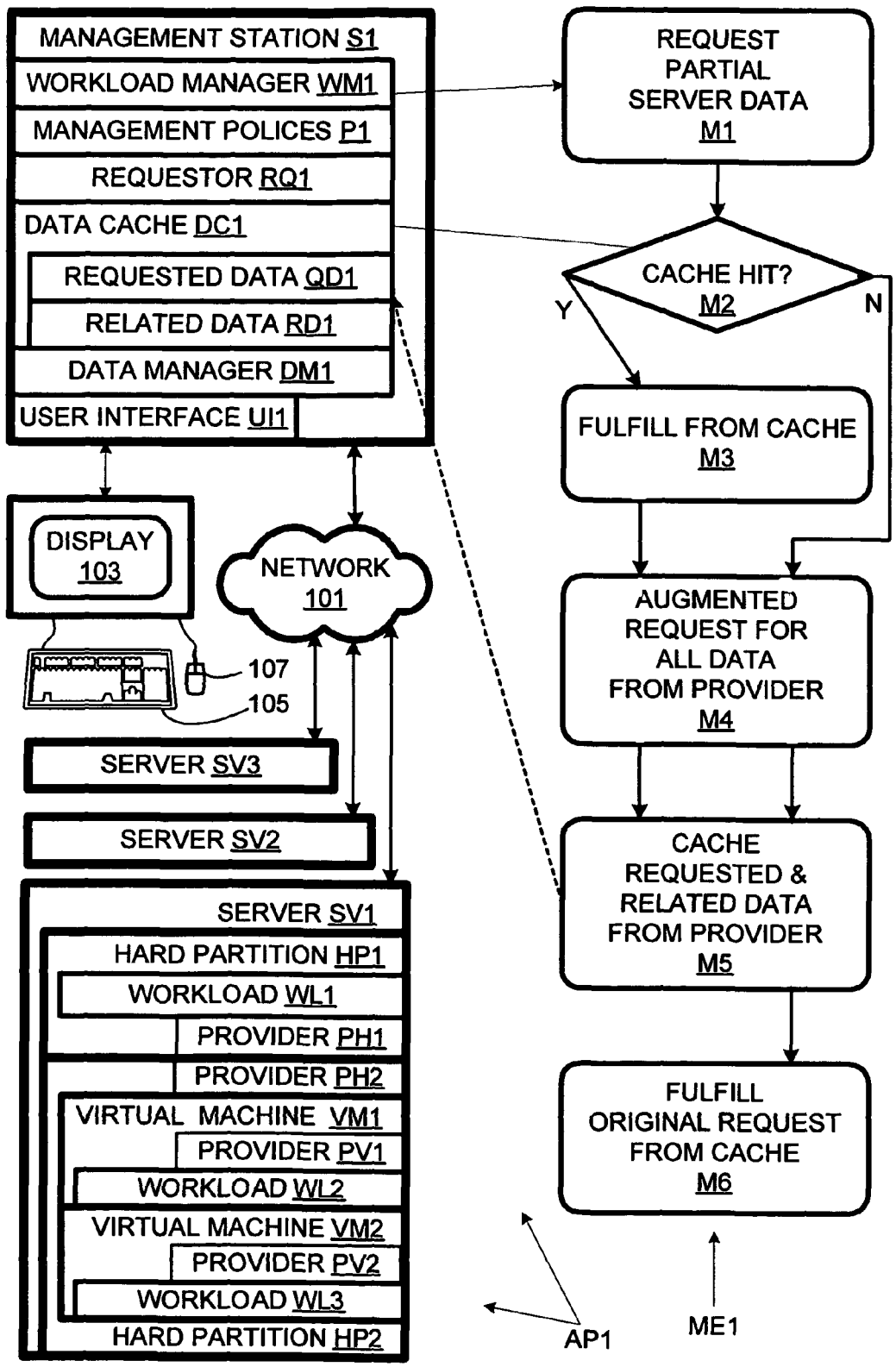

MANAGED COMPUTER NETWORK CACHING REQUESTED AND RELATED DATA FROM REMOTE COMPUTERS

BACKGROUND OF THE INVENTION

Herein, related art may be discussed to put the invention in context. Related art labeled "prior art" is admitted prior art; related art not labeled "prior art" is not admitted prior art.

Centralized management of remote computers requires local access to configuration and utilization data for the remote computers. If required information is gathered from remote computers only upon request, there can be an undesirable latency between the request and provision of the data. This problem can be ameliorated by caching recently used data so that, if it is requested again, it can be supplied from a local cache. In an alternative approach, a management function continuously polls all remotely managed computers so that all data relating to their management is available locally. However, this approach can result in superfluous accesses and consume network bandwidth. The present invention provides for management of remote computers with fewer remote accesses so that network bandwidth is used more efficiently. These and other features of the present invention are apparent from the description below with reference to the following drawings.

BRIEF DESCRIPTION OF THE DRAWING

The following drawing is of an embodiment of the invention and not of the invention itself.

FIG. 1 is a schematic diagram of a management computer network and associated method in accordance with embodiments of the invention.

DETAILED DESCRIPTION

The present invention provides for collecting more data from a provider on a remote computer than is needed to meet a request. The extra data is cached along with requested data, reducing the number of remote computer connections relative to alternative approaches. In many cases, the cost of collecting and caching the extra data is small compared to the reduction in latency achieved when the extra data is requested. By "remote" is meant "accessed over a network".

A network AP1 includes servers SV1, SV2, and SV3, a management station S1, and network infrastructure 101. Server SV1 is divided into two hard partitions HP1 and HP2. Hard partition HP1 runs a workload WL1 and a provider PH1, that can provide configuration and utilization data for hard partition HP1. Hard partition HP2 includes a provider PH2 that can provide configuration and utilization data for hard partition HP2. In addition, providers PH1 and PH2 can provide information regarding the non-respective hard partition.

Hard partition HP2 runs two virtual machines VM1 and VM2, each running a respective workload WL2, WL3. Each of these virtual machines VM1, VM2 has a respective provider PV1, PV2. Each of these providers provides information only for the respective virtual machine. Servers SV2 and SV3 are also partitioned, but for expository purposes their details can be ignored.

The providers can conform to Web-Based Enterprise Management (WBEM), a set of systems management technologies developed to unify the management of distributed computing environments. Alternatively, another protocol can be used, such as the simple network management protocol (SNMP), which forms part of the Internet protocol suite defined by the Internet Engineering Task Force. The SNMP protocol is used by network management systems for monitoring network-attached devices for conditions that warrant administrative attention.

Management station S1 runs several software programs in computer-readable media, including a workload manager WM1, a data manager DM1, a requestor RQ1, and a user interface to the data manager UI1. Workload manager WM1 dynamically reallocates hardware resources to workloads on remote computers in accordance with locally stored management policies P1. To this end, it requests configuration and status information from data manager DM1. Also, a human manager can access data manager DM1 via a user interface UI1, e.g., by using a display 103, keyboard 105, and mouse 107.

A method ME1 is practiced in the context of network AP1. At method segment M1, data manager DM1 receives a request, e.g., from workload manager WM1 or from a human manager, for data pertaining to a remote server. For example, a human manager might request information regarding the CPU utilization of virtual machine VM1.

At method segment M2, data manager DM1 determines whether or not the request can be met from cache DC1. If it can (i.e., if there is a "hit"), the request is fulfilled from cache DC1 at method segment M3. Whether or not there is a hit, at method segment M4, data manager DM1 makes an augmented request for all data from the remote provider of the requested data. In the case of a request for CPU utilization by virtual machine VM1, data manager DM1 makes an augmented request for all data available from provider PH1, including the requested CPU utilization, memory usage, input/output resources and utilization, operating system and version, identity of any applications running on the virtual machine, etc. The augmented request is handled by requestor RQ1, which accesses the specified provider and obtains both the requested and related data in the augmented request.

At method segment M5, requested data QD1 and related data RD1 returned by requestor RQ1 are placed in cache DC1, which draws no distinction based on whether data is in there because it was originally requested or is in there as part of the augmented portion of the request. If at method segment M2, there was a hit, method ME1 ends at method segment M5. However, if at method segment M2, there was a miss, then the requested data just cached is forwarded to data manager DM1 to meet the original request.

Normally, the present invention will reduce the time-averaged number of connections to remote computers required. The illustrated embodiment reduces latency relative to a method in which only requested data is cached in cases when data manager DM1 receives a request for cached related data RD1. The present invention achieves reduced bandwidth requirements relative to a continuous polling approach because data remote systems are accessed only when a request is made. The invention can require more time and bandwidth when fulfilling a request when compared to the request-only cache method. However, this extra latency and time are often negligible. In the event of a cache hit, timing is less critical as the request has already been satisfied from the cache.

The present invention applies to networks with different numbers and types of servers, different technologies (e.g., hard partitions, virtual partitions, virtual machines) for partitioning or otherwise allocating resources. In some embodiments, a remote server running multiple operating systems can have a system-wide provider that gathers all data of interest regarding the host server. In that case, each request to that server is for all information regarding that server and its partitions and workloads.

In the illustrated embodiment, the management station is accessed directly, e.g., not through network infrastructure 101, using attached human interface devices, display 103, keyboard 105, and mouse 107. In alternative embodiments, a management station is accessed over network infrastructure 101 via remote computers or terminals. For example, the user interface can be a web browser so that a human manager can control management network AP1 using a World-Wide Web interface. These and other variations upon and modifications to the illustrated embodiment are provided for by the present invention, the scope of which is defined by the following claims.

What is claimed is:

1. A managed computer network comprising:
   remote servers; and
   a management station for managing said remote servers, said management station having a cache and a data manager, said data manager responding to an original request for originally requested data regarding a server of said servers, some partition thereof, or some workload running thereon, by sending an augmented request to a provider running on said server for not only said originally requested data but also for additional data that was not originally requested but is available from said provider, said data manager storing said originally requested data and said additional data in said cache;
   wherein said server runs plural data providers, said original request pertaining to data available from a first provider and not to data available from a second provider, said additional data being available from said first provider and not from said second provider.

2. A network as recited in claim 1 wherein said management station fulfills said original request from said cache before sending said augmented request.

3. A network as recited in claim 1 wherein said management station sends said augmented request in conjunction with a cache miss.

4. A network as recited in claim 1 wherein said server has first and second hard partitions, said original request pertaining to said first hard partition and not to said second hard partition, said additional data pertaining to said first hard partition and not to said second hard partition.

5. A managed computer network comprising:
   remote servers; and
   a management station for managing said remote servers, said management station having a cache and a data manager, said data manager responding to an original request for originally requested data regarding a server of said servers, some partition thereof, or some workload running thereon, by sending an augmented request to a provider running on said server for not only said originally requested data but also for additional data that was not originally requested but is available from said provider, said data manager storing said originally requested data and said additional data in said cache;
   wherein said server runs first and second virtual machines, said original request pertaining to said first virtual machine and not to said second virtual machine, said additional data pertaining to said first virtual machine and not to said second virtual machine.

6. A method comprising:
   issuing an original request to an automated manager for managing remote servers including a first server, said automated manager managing said remote servers over a network, said original request pertaining to said first server;
   attempting to fulfill said request from a local cache;
   issuing an augmented request to said first server; and
   caching data received from said first server, said data including main data in response to said original request and additional data that was not called for by said original request but was called for by said augmented request;
   wherein said first server runs plural data providers, said original request pertaining to data available from a first provider and not to data available from a second provider, said additional data being available from said first provider and not from said second provider.

7. A method as recited in claim 6 wherein said augmented request is issued in the event of a cache hit allowing said original request to be fulfilled from said cache.

8. A method as recited in claim 6 wherein said augmented request is issued in the event of a cache miss.

9. A method as recited in claim 6 wherein said server has first and second hard partitions, said original request pertaining to said first hard partition and not to said second hard partition, said additional data pertaining to said first hard partition and not to said second hard partition.

10. A method comprising:
    issuing an original request to an automated manager for managing remote servers including a first server, said automated manager managing said remote servers over a network, said original request pertaining to said first server;
    attempting to fulfill said request from a local cache;
    issuing an augmented request to said first server; and
    caching data received from said first server, said data including main data in response to said original request and additional data that was not called for by said original request but was called for by said augmented request;
    wherein said first server runs first and second virtual machines, said original request pertaining to said first virtual machine and not to said second virtual machine, said additional data pertaining to said first virtual machine and not to said second virtual machine.

* * * * *